United States Patent [19]

Klein

[11] Patent Number: 5,273,301
[45] Date of Patent: Dec. 28, 1993

[54] FORK AND STEERING ASSEMBLY FOR BICYCLES

[75] Inventor: Gary G. Klein, Chehalis, Wash.

[73] Assignee: Klein Bicycle Corporation, Chehalis, Wash.

[21] Appl. No.: 842,407

[22] PCT Filed: Sep. 27, 1990

[86] PCT No.: PCT/US90/05426

§ 371 Date: May 22, 1992

§ 102(e) Date: May 22, 1992

[51] Int. Cl.[5] .............................................. B62K 21/06
[52] U.S. Cl. ....................................... 280/279; 280/280
[58] Field of Search ............ 280/274, 279, 280, 281.1, 280/288.3

[56] References Cited

U.S. PATENT DOCUMENTS

| | | | |
|---|---|---|---|
| 4,437,679 | 3/1984 | Campagnolo | 280/281.1 |
| 4,993,735 | 2/1991 | Chen | 280/279 X |
| 5,002,297 | 3/1991 | Klein | 280/279 |
| 5,016,895 | 5/1991 | Hollingsworth et al. | 280/280 |

Primary Examiner—Margaret A. Focarino
Assistant Examiner—Victor E. Johnson
Attorney, Agent, or Firm—Jim Zegeer

[57] ABSTRACT

A light weight aluminum bicycle fork with positive feel and improved control in rough conditions, and is stiffer in torsional stiffness, fore and aft stiffness and side-to-side stiffness and has a higher overall rigidity than prior art forks. A large diameter steering tube has an hourglass external surface and bearing raceway seats formed therein and a very large diameter head tube has a corresponding bearing raceway seat formed in the lowered end thereof to receive, by way of a press-fit, aircraft-type torque tube bearings. An upper bearing assembly is seated in a raceway seat formed in the upper end of the head tube. Adhesive is used to maintain the bearings in position and prevent their loosening. A pair of large diameter crown miter tubes are welded to the lower end of the steering tube and a pair of large diameter, tapered, blade tubes are welded to the crown miter tubes and have dropouts welded to the lower ends of the blades. The blades utilize proportional tubing with metal located at specific locations on the wheel sides where maximum stress forces are found. A one-piece aluminum bar, neck and large diameter stem is provided. A tightening wedge and the stem have complementary camming surfaces which are at a shallow angle.

7 Claims, 7 Drawing Sheets

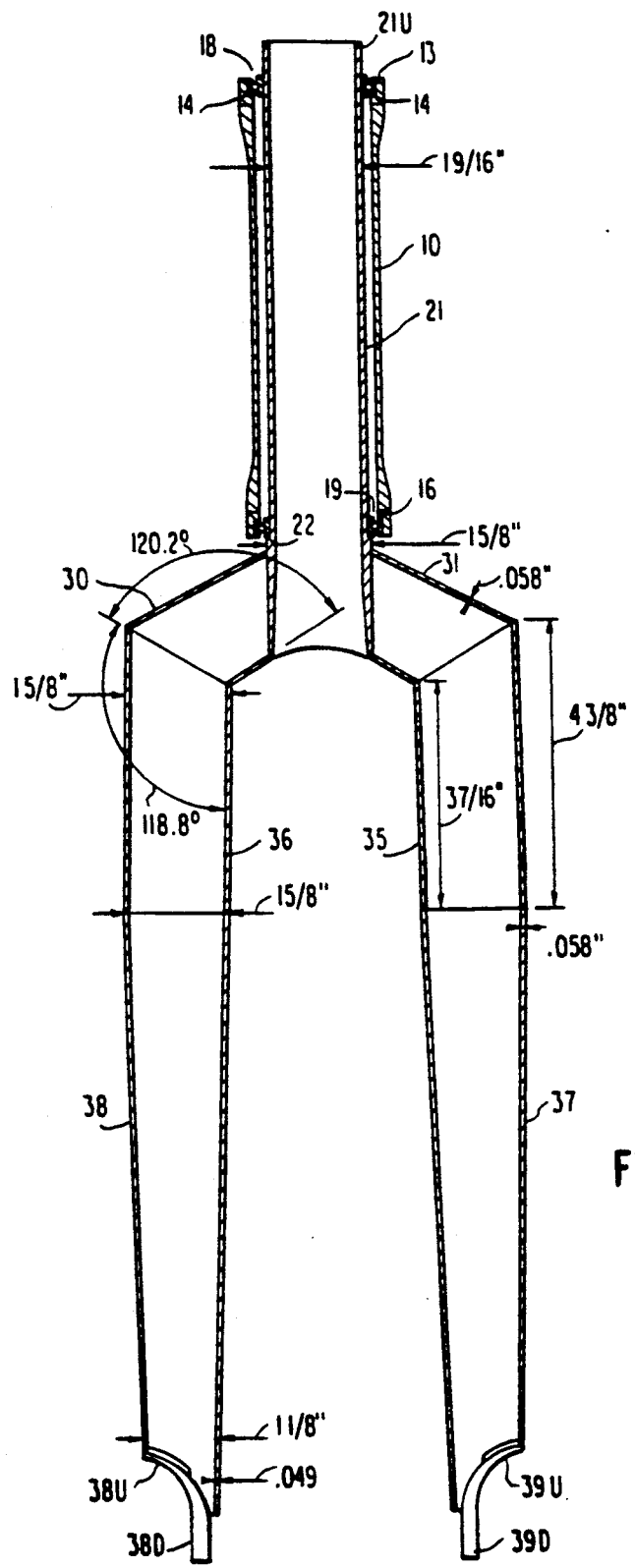
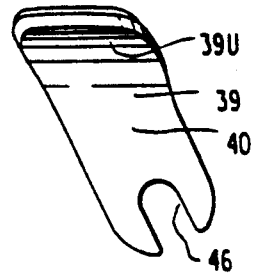
FIG. 1a
FIG. 3

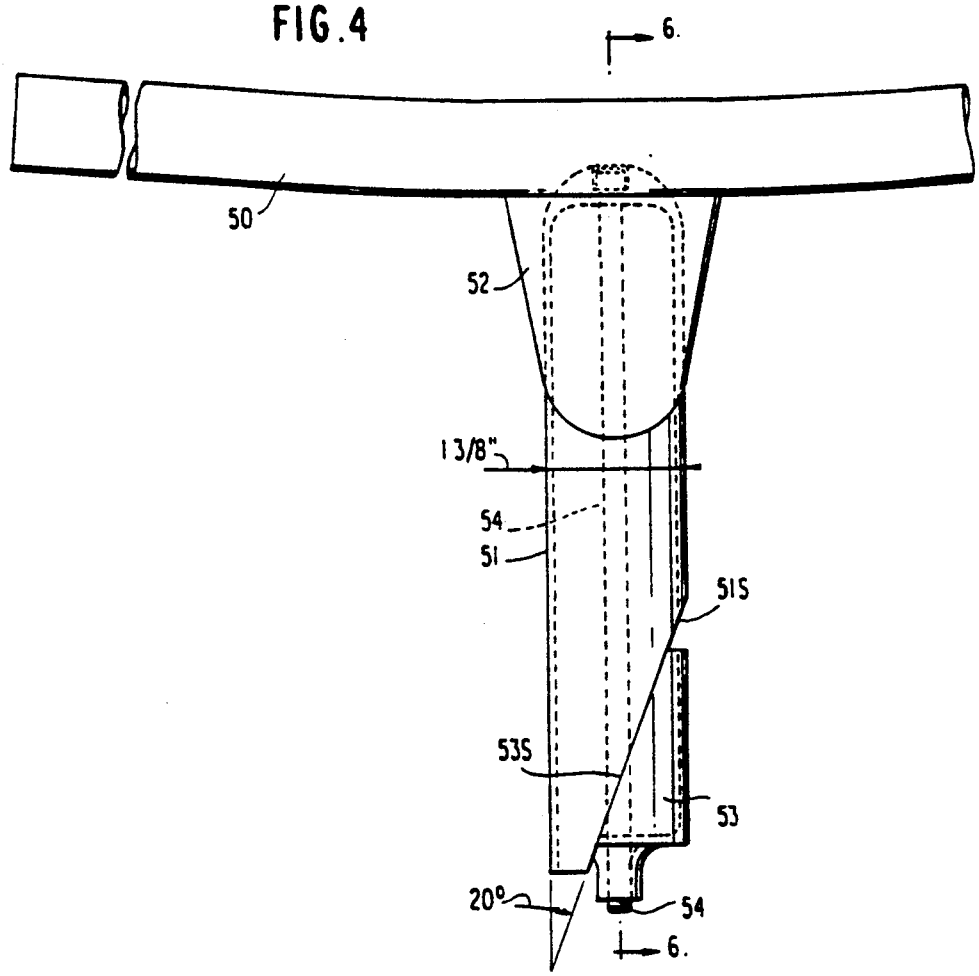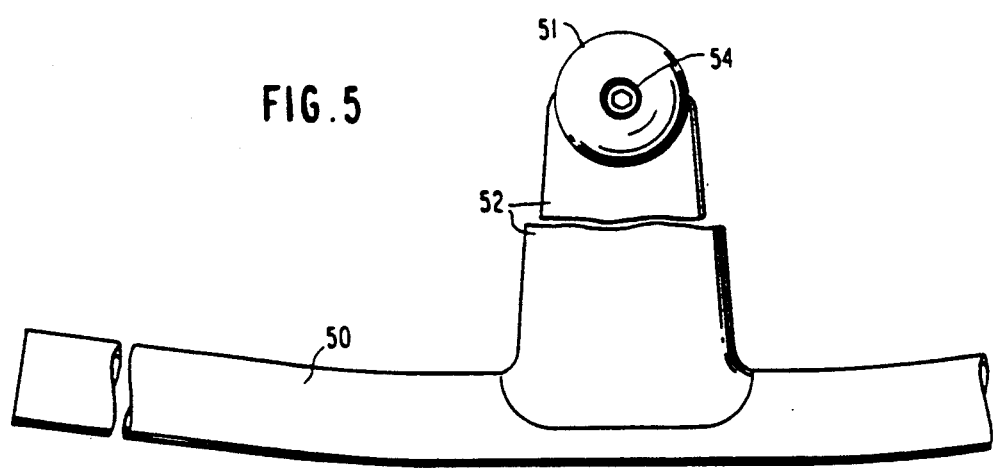

FORK AND STEERING ASSEMBLY FOR BICYCLES

The present invention relates to improvements in bicycles, more particularly to the front fork and steering assembly.

BACKGROUND OF THE INVENTION

In my Patent U.S. Pat. No. 4,500,103 for a HIGH EFFICIENCY BICYCLE FRAME, very large diameter frame tubing is used in a bicycle to resist relatively large torsional and bending forces to produce a bicycle which is very light in weight yet extremely rigid and which, at the same time, provides an extremely good ride. In my Patent U.S. Pat. No. 4,621,827, I disclose a bicycle in which the chainstay tubes are made of unequal rigidity and made in such a way so as to increase the power train efficiency by reducing the magnitude of frame deflection caused by chain stress. The present invention is directed to improvements in the steering and front fork assembly head set bearing and handlebar stem of a bicycle.

The front fork of bicycles typically have been steel with about one inch steerer (e.g., one inch outside diameter steerer post in steel). That is what the headset bearings and all the headset pieces were made to accommodate and the one inch size was limiting in steel. The steel steerer uses a fairly thick wall near the crown in order to make the fork strong enough.

In the bicycle described in my patent U.S. Pat. No. 4,621,827, the head tube had an outside diameter of about 1.42 inches and an inside diameter of about 1.180 and a center section wall thickness of about 0.065 inches. In order to fit in one inch bearing size constraint in aluminum, a solid bar had to be used and it still is not strong enough because of the small diameter size.

In the past, on mountain bikes and on some road bikes, others have started promoting larger headset sizes with 1¼ inch steering tubes. This is still made of steel in order to make the forks more rigid for better cornering control but they are still essentially about the same weight or heavier. There have been suggestions of aluminum forks. These use a conventional headset and headset bearing units. Hence, the front fork and headset assembly of a bicycle has been the heavy end of the bike and it has been the end that gets the most shock.

There has been introduced to the market a number of front forks which do not have curved blades but which have instead straight blades and there is controversy in the bicycling art concerning whether these straight blades provide harsher riding forks or not. The present invention uses straight blades.

The wheel axle is typically offset forward of the steering axis in order to obtain desirable handling. This offset is called the fork rake. The present invention uses a fork rake of about 1½ inches.

Headset bearing failures are a frequent problem in off-road bicycles. The repeated impacts of off-road use brinell the bearings, loosen the bearing housings in the head tube and the fork crown, loosen and damage the threaded adjustment mechanism. Because of angular misalignment tolerances necessary for inexpensively machined steerer crowns, head tubes and adjusting threads, the traditional bearing assemblies use a cup and cone system, where the radius of curvature of the balls is much smaller than that of at least one of the raceways. This allows the bearing to tolerate angular misalignment and substantially reduces the contact area of the balls, compared to the Super Conrad style bearing—with raceways closely fitted to the balls. The rigidity of the point contact style bearings is thus substantially lower than that of the torque tube type bearing and the load carrying capacity is very much lower. This invention is able to fully utilize the advantages of double-sealed aircraft torque tube type bearings by machining the outside diameter of the steering tube for direct fit and adhesive bonding of the headset bearings to the external surfaces of the steering tube and raceway seats in the head tube, insuring accurate alignment. The ends of the head tube are also precision bored for alignment, and also benefit from direct fit. The threaded adjustment of traditional headsets is another source of trouble. The threads weaken the thin wall steering tube and can break there, especially if the handlebar stem is clamped inside the threads.

The invention results in a bicycle front end which does not require frequent adjustment or services with far greater durability, and is directed to improvements in the front fork and headset and steering assembly and is particularly directed to the utilization of very large diameter aluminum tubing, a unique headset bearing assembly. According to the invention, the fork blades are greater than about 1½ inch in diameter at the top and about 1⅛ inch at the fork ends down at the tip. They are, in the preferred embodiment, rounded all the way: they are straight for a predetermined distance and then they taper and have a wall thickness proportional to the forces or loading at specific locations on the blades.

Each blade is mitered at the crown end at an angle and a specially configured crown tubing is mitered to fit up against the blade. It is very difficult to bend the big tube easily and have a tight radius so in the disclosed embodiment the large diameter aluminum tubing is miter cut and welded.

Furthermore, instead of using a conventional headset, a steer tube of about 1⅝ inch diameter was utilized and the part that goes up through the bearings is about 1-9/16 inch so that the steer tube is actually about 1-9/16 inch. The outside diameter of the bearings is about two inches so that the head tube has a diameter of about 2¼ inches at the top and bottom to provide raceway seats to fit the bearings and the bearings are pressed fit and adhesively bonded right to the head tube and to the steering tube. In this present application, the steerer tube has been machined to locations where the stress or forces are less and tapered to the bearing seats where the tube wall is thickened.

This extremely large diameter head tube along with the large diameter steering tube or post provides a more positive control in rough conditions and is significantly stiffer in both torsional stiffness and fore and aft stiffness and side-to-side stiffness than traditional one inch steerer forks and has essentially the same rigidity as the more recent larger 1¼ inch forks. Moreover, the weight is significantly less than any prior art fork and steering assembly having equivalent rigidity.

The crown piece according to this invention is much larger than that used in a regular fork. With this in mind, if standard headset bearings are used, the front end of the bike is elevated in the air e.g., the stack height is exaggerated. Hence, instead of using a conventional headset, this invention utilizes about 1⅝ inch steer tube and the part that goes through the bearings is about 1-9/16 inch diameter so that in effect a machined to about 1-9/16 inch steer tube up through the bearings and forms a shoulder or raceway seat. As noted above, the steering tube has had metal machined at points of lower stress or loading to reduce weight without sacrificing strength and safety. The outside diameter of the bearings is about two inches. The upper and lower bearing raceways are further secured in place with an adhesive, preferably an anerobic adhesive but epoxy adhesives can also be used.

Further, according to the invention the handlebar, neck and stem are unitized and designed to accommodate the larger head tube and steer tube discussed above. In a preferred embodiment, the stem is about 1⅛ inches in diameter and has a wall thickness of 0.070 inches and a lighter stem and handlebar. This again adds to the positive feel and control on it and the ride is very good notwithstanding the fact that there is reduced flex in the front forks. It is believed that the large flex in the front fork is not necessary because when going over rough terrain and the front wheel for example, hits a bump, the fork being angled towards it the flexible fork will flex backward and in flexing backward bumping the front end of the bike to jack it up in the air in a pogo-stick-like effect. This increases the actual vertical movement over what occurs with a stiff rigid fork as is disclosed in the present application. The stiff fork reduces the degree of bounce so that when you hit a bump, instead of the fork flexing back and raising the front end of the bike and causing it to loose contact with the terrain, the fork does not flex back and the tire seems to deflect more. According to the invention, the tire is made to work harder and the bike stays on track better. That is, the bicycle stays on the ground and control is better and the feel is good and the bicyclist has a feeling of being in control on it, which is very useful. Moreover, the cyclist can go at a higher speed because of having more control, and the traction seems to be better particularly on downhill runs.

The invention has been applied to a mountain bike but it is believed to be just as applicable to road bikes. However, the road bike fork tubing need not be quite as large as the mountain bike, it can be made lighter and use a smaller headset size and smaller blades for cosmetic and air resistance reasons.

The overall effect is to reduce the weight of the front end of the bike by about a pound and one-quarter to about a pound and one-half. The headset is lighter, the front fork is much lighter and the handlebar, neck and stem are likewise lighter. This is due in part to the fact that it is a one-piece handlebar and stem that weighs no more than other high quality stems on the market. It will be noted that the fork according to this invention, will only fit a bike made with the larger head tube. Hence, the invention takes a special frame and a special head tube to adapt to it. Normally new fittings are required. Aircraft torque tube bearings from the bearing assemblies are used. The threads that are needed to adjust the bearings have been eliminated because the bearings are direct press and adhesive secured bearings and no threads are needed. This type bearing adds to the positive feel and control obtained in bicycles according to the invention because they have a lot more rigidity in the torque tube bearings than normal bike bearings have. Placing the bearings inside the head tube strengthens the bearing joints for the head tube.

The present invention deals with the proportional tubing utilized in the fork blades. In the prior art, the blades typically used a straight tube which is the simplest design wherein the uniform wall for each tube increases the wall diameter until the tube has sufficient strength to take all loads and load concentrations. However, this results in a very heavy tube. Butted tubes utilize thin-walled tubes in the center and heavier walls at each end. Stresses are cantilevered at the tube ends where they join with the other tubes. The walls are able to take higher joint stresses while the thinner section allows reduced weight. The reason for proportional tubing, in bicycle frame design, is that the stresses in the tubing cantilevered toward the ends, but the actual working loads are not uniformly distributed around the circumference of each frame tube. In the main frame, in the region of the head tube, the largest loads are the result of high vertical landing loads and head-on impacts. Thus the top and bottom surfaces of the frame tubes see much higher loads than the sides. As known in the art, a more efficient use of material is to reinforce the top and bottoms to special dimensions of the tube (other than round) or increased wall thickness at the top and bottom of the tube, or the combination of the two.

In the front forks, the normal loading includes some torque loads and some side loading. The heaviest loads will come from vertical bumps or head-on impact and/or braking forces. Both vertical and longitudinal forces stress the front fork at a fore/aft cantilever bending motion. In a simple analysis, it appears that increasing the strength of the fork blades and steerer fore and aft cantilever would be the correct approach.

However, it has been discovered through actual testing and detailed analysis that forces in the fork blades are displaced to the side where the steerer attaches, or the wheel or inside of the fork, a small amount. Thus, the optimum here, according to the invention, is not a direct fore and aft reinforcement, but two reinforcements (e.g. thicker wall) are shifted slightly to the inside of the fork as can been seen in the drawings attached hereto. Another factor is that there is a high degree of compressive stress resulting from the vertical bump loading. Thus, in the preferred embodiment, the front of the blades is reinforced a little bit more (e.g., thicker wall and more metal) than the rear because of the straight compressive stress and the cantilevered compressive stresses are cumulative in the front of the blade and oppose each other in the rear. Thus, there is a slight differential in the thicknesses in these areas.

BRIEF DESCRIPTION OF THE DRAWINGS

The above and other objects, advantages and features of the invention will become more apparent when considered with the following specification and accompanying drawings wherein:

FIG. 1 is a front sectional view through the front fork, head tube and headset bearings incorporating the invention FIG. 4 is a front view of the bar and oversized stem incorporated in the invention, FIG. 5 is a top view of the bar and oversized stem incorporated in the invention.

DETAILED DESCRIPTION OF THE INVENTION

Figure 1B:
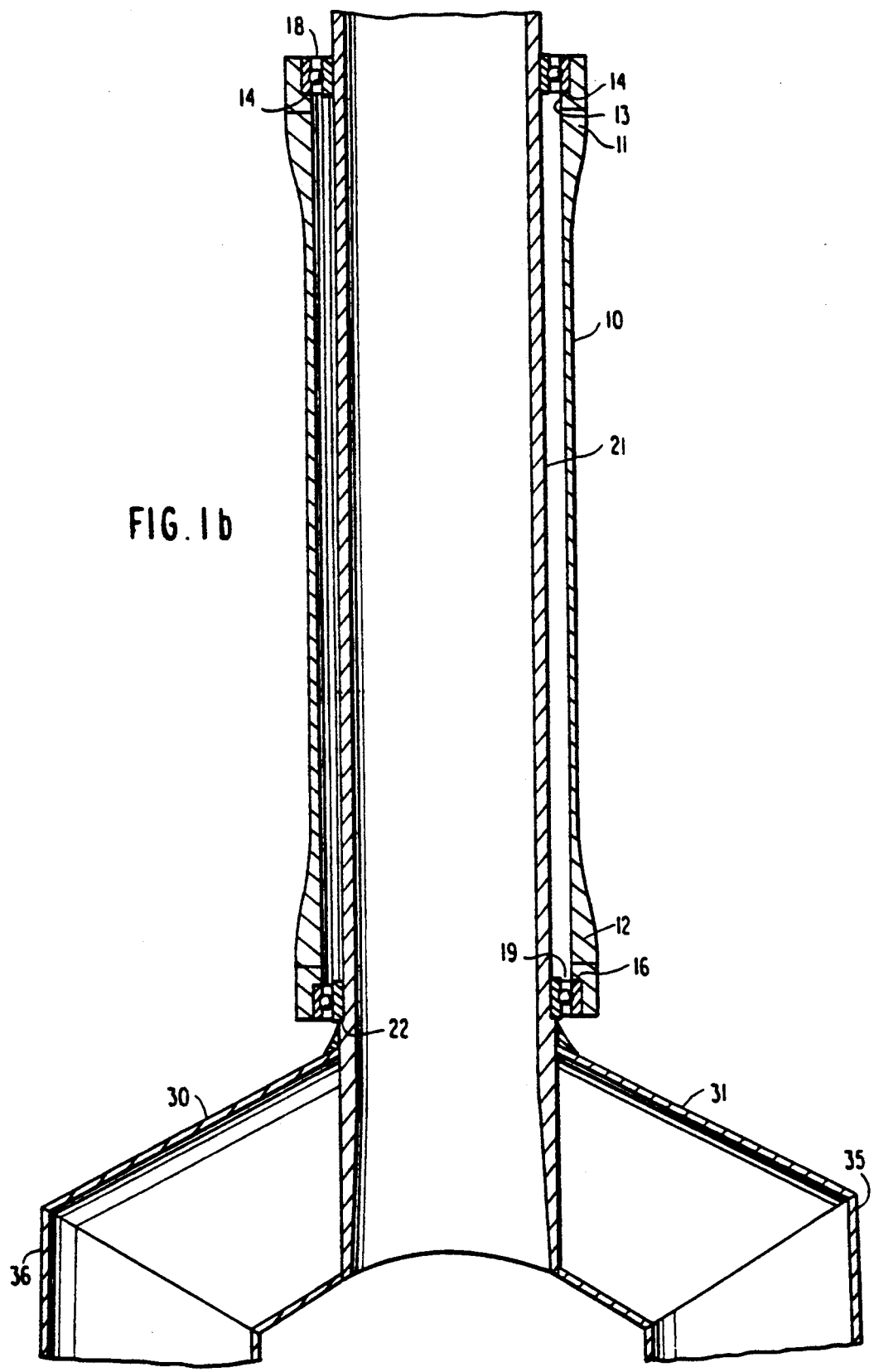
FIG. 1b is an enlarged portion thereof.

Referring now to FIGS. 1a, and 1b, the fork and head tube assembly is illustrated in section with the head tube 10 having a large internal diameter of about 1⅝ inches (in this preferred embodiment) and uniform throughout the length of the tube and an external diameter or OD of 2 inches in the central body portion thereof and thickened to about 2¼ inches OD at each end. In this embodiment the overall length of the head tube is about 6 inches (which obviously depends on the frame size). The upper end 11 and the lower end 12 of head tube 10 are thicker than the intermediate central body portion with the internal upper edge 13 having an annular shoulder formed therein to form a top raceway seat 14 and the lower end likewise provided with an annular shoulder to form a lower raceway seat 16. Aircraft control or torque tube bearings 18 and 19 are press fit into raceway seats 14 and 16, respectively and an adhesive, preferably an anerobic adhesive, is used to permanently maintain them in place. These are super strong and durable double-sealed aircraft control or torque tube bearings which have a long life and are capable of taking at least 3200 pounds of thrust, 6800 pounds of radial load capacity per bearing. The arrangement just described provides a headset bearing arrangement which does not require any threads which loosen and/or get damaged thereby securing said headset bearing and front fork in place solely by adhesive bond. It provides a super lightweight headset with a minimum stack height. The adhesive also isolates the steel bearing raceways from the aluminum and seems to help reduce corrosion. It should be noted that years of experience of use of a anerobic adhesive in the bottom bracket bearings has borne this point out.

The front fork (constituted herein by steering tube 21, short crown tube miter pieces 30, 31, straight blade tubes 35, 36 and tapered blade tubes 37, 38 and dropout 38D, 39D) is made of large diameter, shock absorbing heat treated aluminum construction and provides positive steering control, is ultra light super strong in design and has a large tire clearance. Specifically, the steering tube 21 is extraordinarily large in diameter compared to prior art steering tubes (some of which are as large as 1¼ inch, as noted above). In this invention, the lower end of the steering tube just above the crown portion is provided with a bottom race seat or annular shoulder 22 which seats the inner race of the lower headset bearing 19. Thus, the loading from the front wheel is transmitted through the upper and lower bearings to the head tube, providing a very short stack height. By putting the bearings inside the head tube in the manner illustrated in FIG. 1, and using an adhesive to secure the bearing raceways in place at the head and steering tubes, the bearing joint for the head tube is significantly strengthened and the stack height reduced. The upper end 21U of steering tube 21 may be provided with a large diameter seal member (not shown).

As shown in FIG. 1, the internal lower end of the steering tube is machined to have a slight taper, and the outer diameter of the upper portion of the steerer tube is completely machined.

The lower end of steering tube 21 has welded thereto a pair of laterally extending crown miter pieces 30 and 31. These are large diameter round or ovalled tubes having the same diameter as the upper straight ends 35 and 36 of the fork blades. Crown pieces 30 and 31 have their lower ends miter cut to form the angles indicated and are heliarc welded to the steering tube and to the upper ends of the respective blades 35, 36. The ends of crown miter tubes 30 and 31 are shaped complementary to the curvature of the head tube so that when heliarc welded to the lower end of steering tube 10, it results in a very strong and rigid joint. After the final weldments are made, the fork unit is heat treated to a T6 condition.

In the embodiment illustrated, the length of the straight blade section of about 1⅝ inch aluminum tubing is, on the outer periphery of about 4⅝ inches and, on the inner periphery 3-7/16 inches. At the lower end of the tubes 35 and 36, the upper ends of tapered tubes 37 and 38 are welded thereto. These taper from about 1⅝ inch, as illustrated down to about 1¼ inch diameter and have the wall thickness tapering from about 0.058 inches at the crown to about 0.049 inches at the dropouts. These aluminum tubes with their given dimensions provide a very rigid super strong design with shock absorbing heat treated aluminum construction and thereby provides positive steering control with minimum lateral (sideways) flexibility, with maximum cornering and traction and control. It provides super rigid brake mounts (not shown) and a very large tire clearance in an ultra lightweight fork design.

Figure 2A:
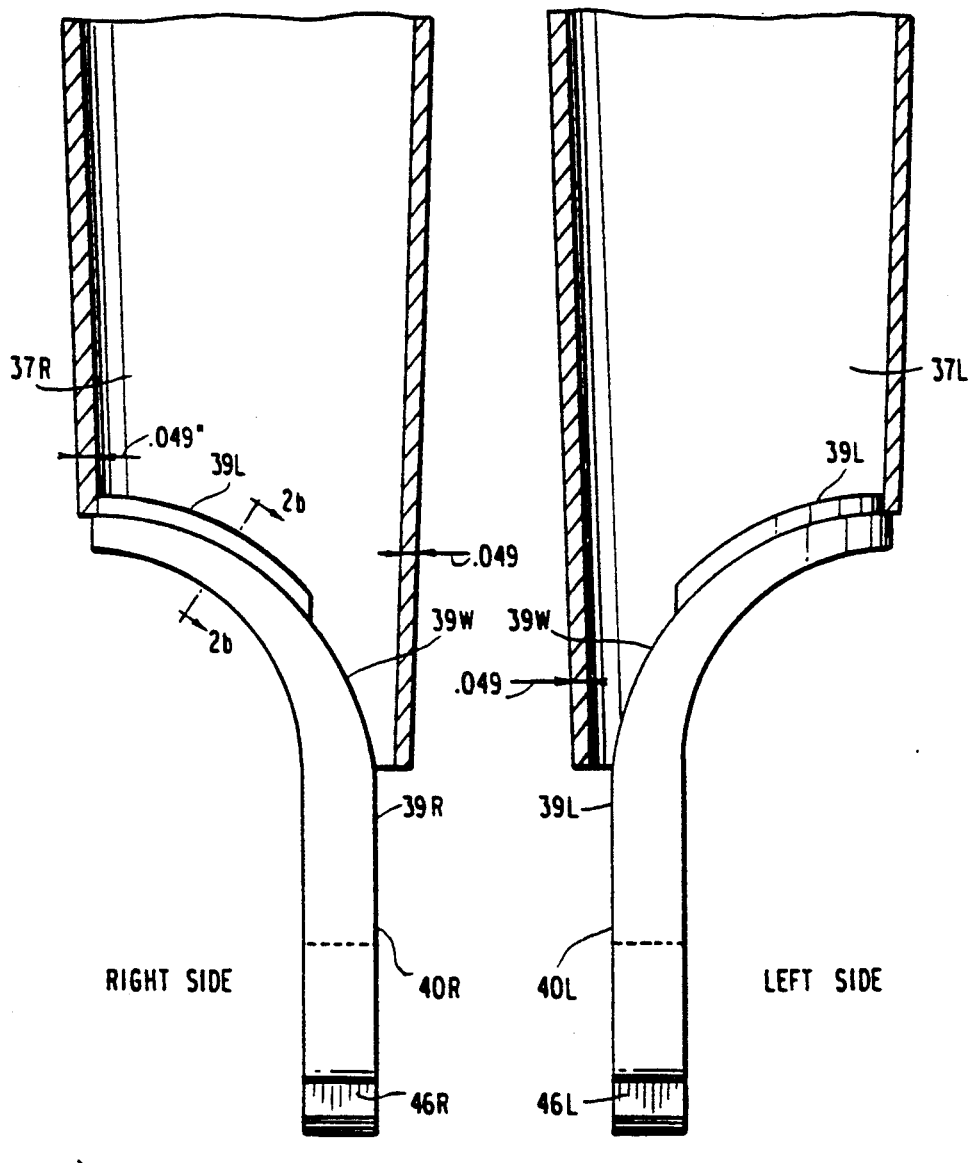
FIG. 2a is a front view of the lower end of the fork blades (the spacing between dropouts has been reduced) showing the dropout incorporating the invention.
Figure 2B:
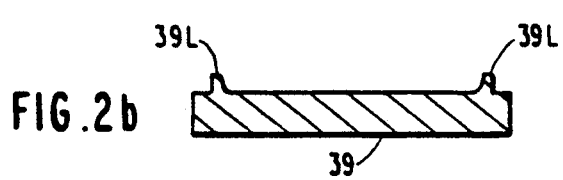
FIG. 2b is a sectional view through lines 6—6 of FIG. 2a, FIG. 3 is a side view of the dropout according to the invention.
Figures 6A, 6B:
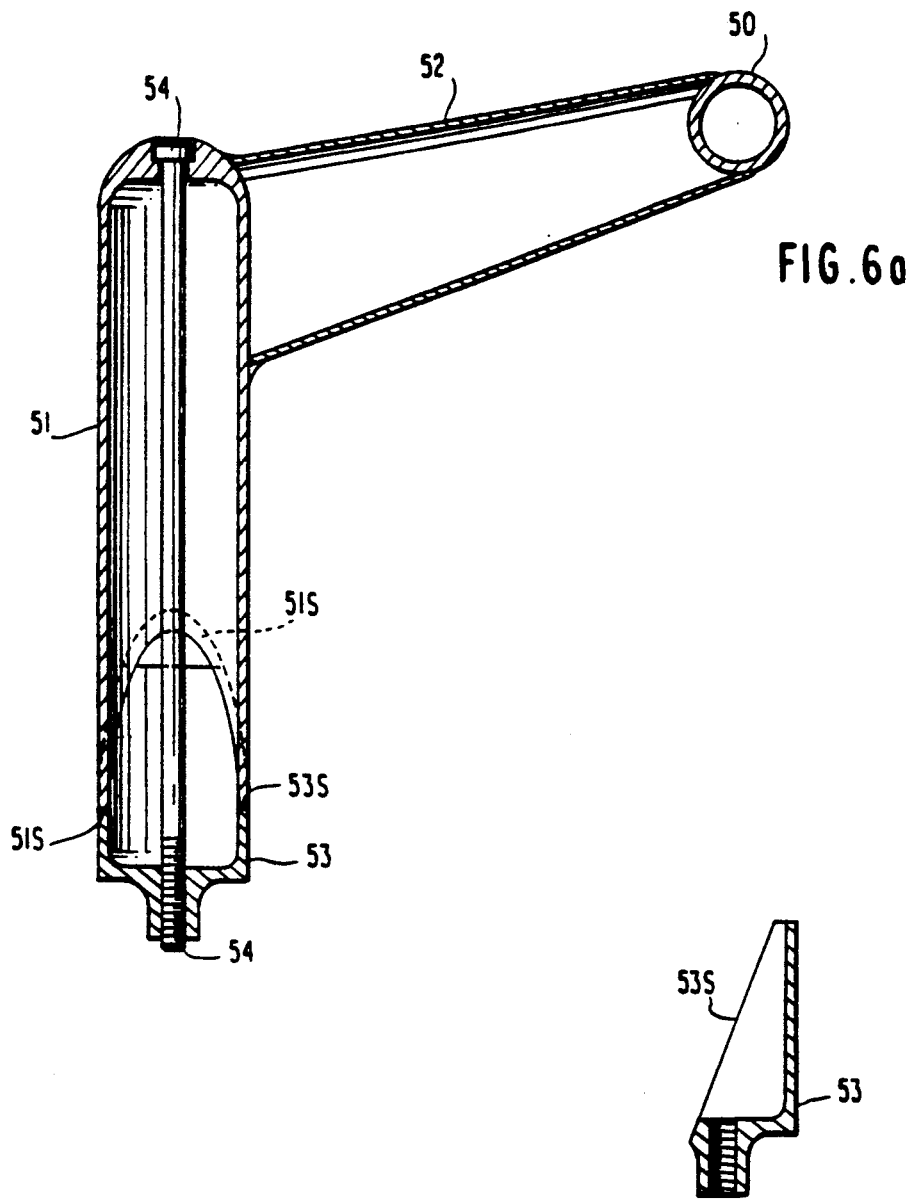
FIG. 6a is an enlarged sectional view through lines 6—6 of FIG. 4.
FIG. 6b illustrates the tightening wedge in section.

The dropout design is illustrated in the front view of FIG. 2a, which is an enlarged view of the dropouts. (In this enlarged view, the left and right blades have been moved together.) It will be noted that the curvature of the upper end 38U, 39U of the drop out members 38D, 39D are curved and the lower ends of tapered tubes 37, 38 are complementary curved to provide, when the dropouts are welded in place, a very strong joint. The dropouts 38D, 39D have curved upper ends which have a "U" shaped positioning ridge or lip 39L and are heliarc welded into the correspondingly curved lower ends of the taper tube portions 37, 38, thus completing the blades for the front fork. U-shaped notches 40 receive the front wheel axle. (The letters "L" and "R" correspond to left and right.)

FIG. 4 is a front view of the bar 50 (which has tapered walls), stem 51, neck 52 and tightening wedge 53. Neck 52 is shaped at each end joining tube and tapered wall bar 50 for strength and lightweight. The bar 50 is welded to neck 52, which, in turn, is welded to stem 51. These components are made of 6061 aluminum, which is heat treated to a T6 condition after welding. Tightening wedge 53 is made of 7075, T6 aluminum. The camming surfaces 51S and 53S have an angle which is much shallower (20 degrees or less) than in the art. This results in a longer wedge 52 and much better grip surface and more holding power on the internal surfaces of steering tube 21. A small diameter (6 mm) threaded long bolt 54 is used to draw tightening wedge 53 against mutually camming surfaces on the wedge and stem. Note that the stem 51 and tightening wedge 53 are of large diameter and include a longer large diameter clamping wedge for more evenly distributing pressure to provide a tighter grip with less force.

The cam surfaces 51S on stem 54 according to this aspect make the wedge 53 operative over 2 inches in actual clamping length. This is the distance the two mating wedge surfaces 51S and 53S are in contact along the axis. Some wedge parts may extend beyond the bottom edge of the stem but this extra length of contact is not balanced and creates even more highly concentrated stress points higher up and in the preferred embodiment is not desirable. By spreading the load along the axis, the stem is held much more securely, with lower concentration of stress on the steering tube 21. Traditional stems have an effective clamp length of less than one inch, with a typical ramp angle of about 35 degrees.

Another advantage of the longer wedge comes in the bending moments applied to the stem from the handlebars. The side-to-side and front-to-back bending loads need to be rigidly transferred to the fork steerer in order to prevent metal fatigue, fretting, or loosening of the clamped assembly. The standard stem fits into the fork steerer with some degree of play, usually on the order of about 0.005 inch but it has been measured over 0.010 inch in some cases. With play in the top portion of the machined stem, the only place it fits tightly into the fork steerer is at the wedge clamp location, where the wedge is expanded to fit. Thus, the side-to-side flexing of the stem applies a bending moment to the wedge area. The preferred configuration with the 2 inch length of clamp, gives greatly increased resistance to the bending moments than the traditional shorter clamp assemblies. The ramp not passing all the way across the stem diameter also increases the amount of surface actually being applied to clamping forces.

The traditional stem wedge bolts are 8 mm diameter by 1.25 mm thread steel Allen socket head cap screws. Combined with the typical 35 degree wedge angle, the clamping is marginal, as the ramp exerts about a 1.4 multiplier of bolt tension to radial clamping force (under ideal conditions).

The preferred configuration according to this aspect, in the traditional 0.875 inch size, uses a 6 mm diameter by 1 mm thread steel allen socket head bolt 54 combined with a 16 degree wedge angle, and long clamping length. Although the bolt 54 has only 56 percent of the cross sectional area of the traditional size, and thus somewhat reduced strength (it is preferred to use a higher grade of bolt than normal which somewhat compensates) the 16 degree ramp angle of the 0.875 inch model exerts about a 3.5 multiplier of the bolt tension to radial clamping force (under ideal conditions). This gives more than twice the available radial clamping force over the traditional stem and wedge assembly.

The preferred configuration, in the new super size 1.375 inch diameter, also uses the 6 mm diameter stem bolt 54, but with about a 20 degree wedge angle. The 1.375 inch stem 51 utilizes a thin 0.070 wall. The wedge 53 also uses a similar thin wall tubular design, unlike solid wedges of other manufacturers. The thin wall still achieves very high strength because of the large diameter design, but at greatly reduced weight. The 20 degree wedge angle exerts a multiplier of about 2.7 times bolt tension, but the twisting torque required to spin the stem is increased because of the increased moment of the larger stem and fork steerer diameters. The larger 1.375 inch diameter stem 51 has 1.6 times more torque resistance for the same radial clamping force as compared to the traditional 0.875 inch diameter stem. This, in combination with the wedge angle multiplier of 2.7 times, gives a torque multiplier of 4.3 (under ideal conditions, i.e., equivalent coefficients of friction, lubrication and so forth). Again, this feature of the invention achieves more than twice the available resistance to torque over the traditional stem and wedge assembly.

The stem clamping must be able to keep the fork steerer from twisting or sliding under normal operating conditions. When the bike is crashed, however, if the stem slips under crashing stress inside of the steerer, it may keep some other damage from occurring. Thus, the ideal stem clamping system would have enough clamping friction to hold it in place, but when stressed unusually hard, be able to slip without damage to either stem or fork.

Traditional stems have caused many fork failures. The highly concentrated pressure of the small wedge or expanding cone in the prior art will expand, bend or even cause the fork steerer to crack. Some of the wedges are made with teeth, serrations or other roughening means in order to effect a more secure grip on the fork steerer. But when the bike is crashed and the clamp is forcibly moved, the teeth gouge the inside of the fork steerer, damaging it. The stems tested that use the surface that bites into the steerer are able to generate enough clamping power in order not to slip under normal off-road conditions (including trails with rocks, logs and roots to ride over). Riding in these conditions requires much more torque to be applied to the fork steerer than would be required on a road bike. In general, the stems of conventional nature with a smooth wedge may slip while riding over a rock or root where some torque is input in order to keep the front tire going in the desired direction. When the stem slips in this condition, the rider generally falls.

The present invention fork, with a fork steerer made of aluminum, would be particularly sensitive to this type of damage. The 1.375 inch diameter stem, with greater than two inches of clamping length, results in stress concentration three to four times less than traditional clamps. The surfaces of the wedge and stem are smooth, and the clamping is more secure than a traditional stem.

The wedge 53 is long, and unlike traditional stems, does not cut completely across the stem, but stops about two thirds of the way across it.

The invention achieves a fine balance of the need for rigid, reliable clamping with the ability to slip under extreme force without damage to the system. This is especially important when using the aluminum alloy fork steerer of the preferred configuration. Further the design achieves very lightweight and high rigidity and strength with the large diameter welded and heat treated one-piece design.

As discussed above, different sections of a bike frame are subjected to different stress loads. More specifically, different sections of a single-frame tube are subjected to different stresses. This fact is used, according to the invention, to eliminate weight while adding strength. According to this invention, the wall thicknesses of the fork blades in particular areas or spots, where high stresses or maximum forces have been discovered, is in direct proportion to the force that the area or spot will see or use. While the general concept of increasing the metal thickness in areas of frame where the maximum stresses occur is known, in the present invention, it has been discovered that in the fork blades the stresses are offset from normal fore and aft (front/back) axis.

Figure 10:
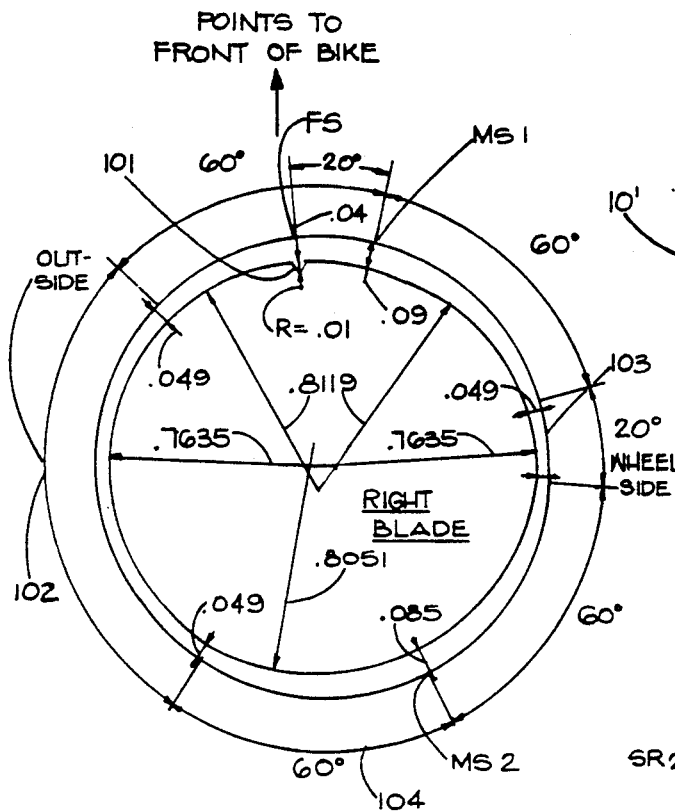
FIG. 10 illustrates the dimensional aspects of the tubing in an exemplary example thereof.
Figure 9:
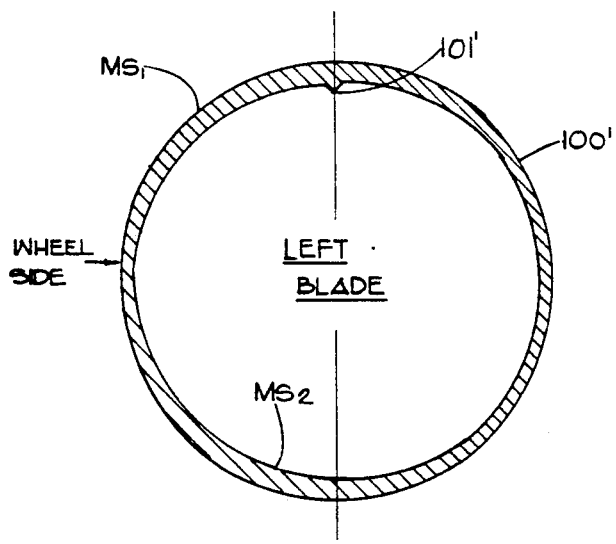
FIG. 9 is a sectional view of proportional tubing incorporated in the invention.

Referring to FIGS. 7-11, and particularly to FIG. 10, the optimum positioning of the metal is not in a front-/back or fore/aft direction but, rather, the two reinforcements are shifted axially to the wheel or inside. (In FIGS. 7-11, corresponding parts corresponding to earlier figures are identified by primed numbers.) In FIG. 10, the tubing 100 initially begins as a straight tube and then having the section illustrated in FIG. 10 and then the lower ends is spun in a manner to be described later herein to produce thicknesses illustrated in FIGS. 7 and 8. FIG. 9 illustrates a left blade, and FIG. 10 illustrates a right blade on a fork, the rib 101 being aligned with the front of the fork and the front of the bike.

Figure 7:
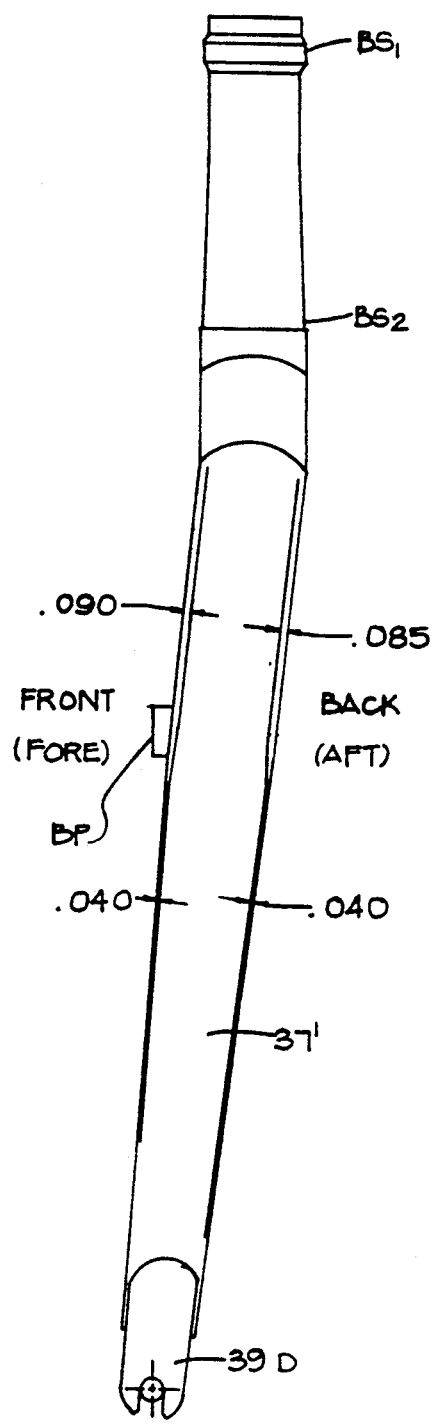
FIG. 7 is a side sectional view of a front fork in which the fork blades include the proportional tubing according to the invention.
Figure 8:
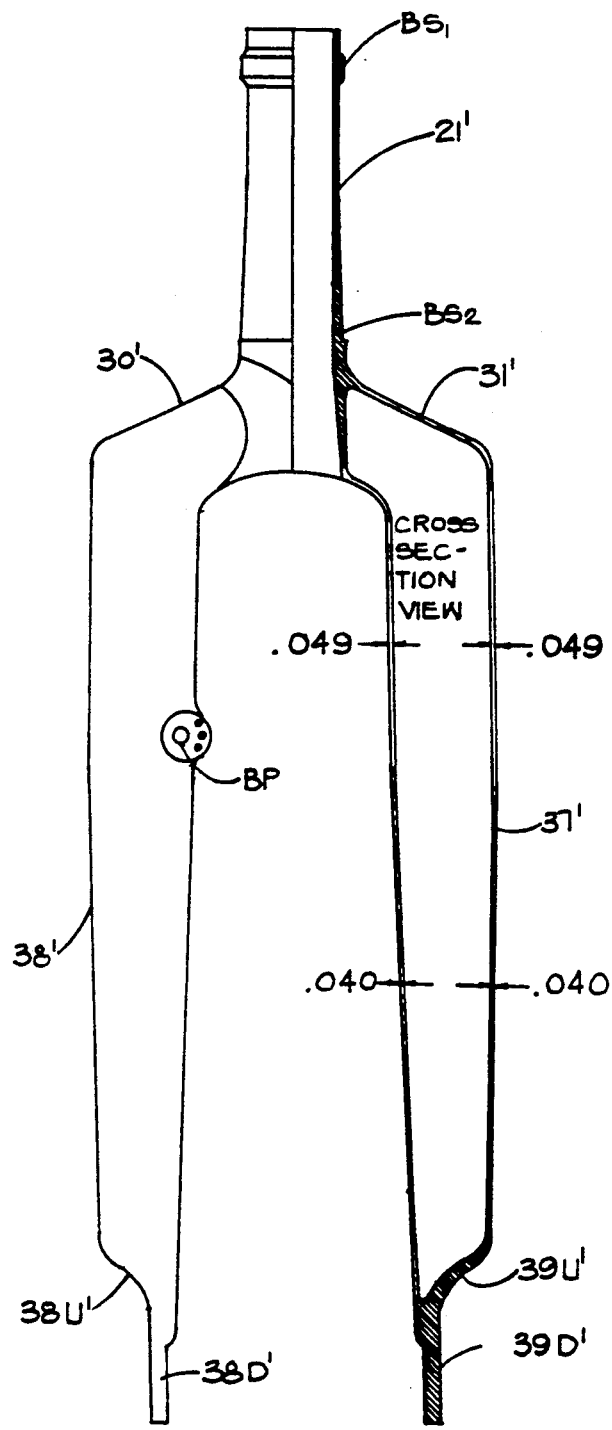
FIG. 8 is a front view with a sectional portion of the front blade and steerer tube illustrating the principles of the present invention.

As illustrated in FIG. 10, the tubing 100 has a rib 101 which is basically a guide rib for the spinning operation but also is used for locating as a point of reference the different angular positions on the tubing. As illustrated, guide rib 101 is behind the direct front edge surface of the blade, the outside edge surface is designated by 102, and the wheel or inside edge surface is designated at 103, and the trailing edge surface is designated at 104. At about 20 degrees from the front edge surface is found the maximum stress or force and here is located the maximum thicknesses (of about 0.09 inches) and at about 60 degrees therefrom and, extending for about a 20 degree space is a low stress sector and a thin portion of the tubing (0.049 inches) and this extends for this 20 degree sector. Then 60 degrees farther (going clockwise) is the next largest thickness portion which is at about 0.085 inches. Note that to each side the thickness gradually increases from the thinner sections (0.049) to the thickest portion (0.09 and 0.085). Thus, the maximum stresses in the fork blades are at the positions indicated at MS1 and MS2 and the least stress is directly at the wheel side and on the outside, where the metal is made thinner. The two 120 degree sectors of reinforced tubing accommodate the maximum stress areas MS1 and MS2, respectively. In FIG. 7, these reinforcement dimensions are diagrammatically illustrated on the front and back sides but they have the displacement illustrated in FIG. 10. That is to say, the maximum thickness of the fork blade is positioned about 20 degrees to the wheel side from the front edge of the blade or from guide rib 101. Similarly, the next second maximum point of stress is the MS2 which is positioned at about 140 degrees from guide rib 101. Note again that the metal gradually thickens from the minimum thicknesses (0.049 inches) to a maximum thicknesses (0.09 and 0.085 inches, respectively). This produces a tubing in which the tube wall thickness in a particular spot or location is in direct proportion to the force that that spot will see in use.

As shown in FIG. 10, guide rib 101 is behind what is to become the front surface of the FS of the blade and about 20 degrees to the inside or wheel side is spot or area MS1 where the maximum stress or forces will be applied and the wall thickness is greatest at this point. The wall thickness gradually decreases from spot MS1 for about 60 degrees to each side thereof to where the the wall thickness 0.049 inches) is thinnest. What becomes the wheel side WS 103 (a space of about 20 degrees) and the outside OS 103 having a space of about 100 degrees (having a wall thickness of about 0.049 inches). A similar gradual thickening from the trailing ends of wheel side 103 to the trailing end of the outside edge 102. This inside trailing or aft edge 104 is gradually thickened to the spot or area MS2 of second highest stress where the wall thickness is about 0.085 inches. This proportional placing or positioning of metal according to the in use loading stress or forces on the wheel side of the fork blades permits a reduction in weight, since the most metal is used where it is most needed, and at the same time, assures a higher degree of safety.

To fabricate the fork blade a length of tubing, having the section shown in FIG. 10, sufficient to form a left and a right blade is cut in the middle. Left and right blade mandrels (not shown) are used to shape each blade to the internal shapes shown in FIGS. 7 and 8. Each tubing is slid onto its left or right mandrel and clamped thereto with each mandrel having a rib guide groove therein for receiving guide rib. The mandrels are mounted in a lathe and a roller is run down the mandrel to spin the lower ends of the fork blades to the taper. This forces the metal in the lower portion of the blade (towards the dropouts) down to the mandrel to put the taper in (with the exemplary dimension (0.040 inches) illustrated in FIGS. 7 and 8). The tubes are cut to proper length for receiving the dropouts and mitered at their upper ends for welding to the crown miter tubes (which, in this case are made of tubing having 0.095 inches thickness). The upper blade portions are straight and do not have the taper.

Conventional brake pedestals or posts BP are welded onto the blades.

Figure 11:
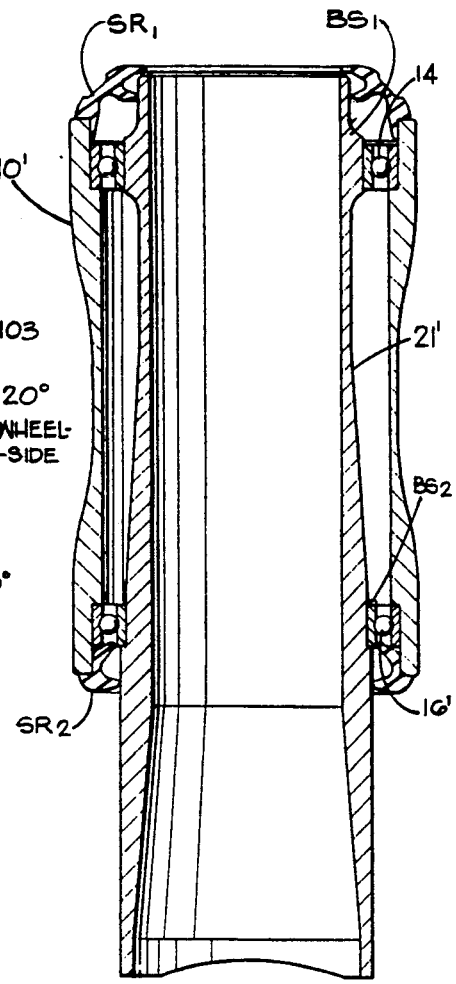
FIG. 11 shows the steerer tube and portion of the head tube according to this invention.

In FIGS. 7 and 11, a similar concept is applied to the steerer tube, which in this preferred embodiment has a somewhat hour-glass configuration on the external surfaces where the location of where the bearing seats BS1 and BS2 have increased thicknesses of metal and the metal therebetween has been machined-down to reduce the amount of metal and hence the weight in these locations. Annular rubber seal rings SR1 and SR2 protect the bearings from water, etc.

It will be apparent to those skilled in the art that other variations may be made within the scope of the invention. It is intended that the above disclosure shall be read as illustrative.

What is claimed is:

1. In a lightweight bicycle fork having a steerer tube having upper and lower ends and a pair of hollow blade tubes having upper and lower ends with the upper ends secured by crown means to the lower end of said steerer tube, and dropouts welded to the lower ends of said blade tubes, said blade tubes having a fore and aft line bisecting fore and aft surfaces thereof, and wheel side portions adjacent a wheel mounted in said dropouts, and non-wheel side portions, the improvement wherein said hollow blade tubes have walls of variable thickness and wherein the thickness of material in said hollow blade tubes in high stress areas on said wheel side portion is greater than said non-wheel side portion in portions having lower stress, and wherein the material forming the walls of said hollow blade tubes gradually thickens from a first thin section about 40 angular degrees into said non-wheel side relative to said fore and aft line to a thickest section about 20 angular degrees on the wheel side of said fore and aft line and then the walls of said hollow blades tubes gradually thin down to a second thin portion about 60 angular degrees from said thickest portion.

2. The invention defined in claim 1 wherein said material forming said hollow blade tubes gradually thickens from said second thin portion through about 60 angular degrees to a second thick portion and then gradually thins to a third thin portion.

3. In a lightweight bicycle having a frame with a head tube having upper and lower ends, a front fork having a steering tube having upper and lower ends passing upwardly coaxially through said head tube and at least a pair of head set bearings, said head set bearings rotatably connecting respective upper and lower ends of said head and steering tubes, the improvement wherein said steering tube has a variable external diameter and exterior surface and wherein the external diameter of said steering tube is greater than 1¼ inches and the exterior surface is machine smooth, each of said headset bearings having raceways which are fitted to and adhesively bonded in place between said head tube and said machined smooth steering tube said fork including a crown welded to said steering tube, including raceway seats machined intermediate the upper and lower ends of said steering tube so that the exterior surface of said steering tube has an hourglass configuration, and bearing raceway seats machined at the upper and lower ends of said head tube for receiving said head set bearings, respectively.

4. In a lightweight bicycle having a frame with a head tube having upper and lower ends, a front fork having a steering tube having upper and lower ends passing upwardly coaxially through said head tube and at least a pair of head set bearings, said head set bearings rotatably connecting respective upper and lower ends of said head and steering tubes, the improvement wherein said steering tube has a variable external diameter and an exterior surface and wherein the external diameter of said steering tube is greater than 1¼ inches and the exterior surface is machined smooth, each of said headset bearings having raceways which are fitted to and adhesively bonded in place between said head tube and said machined smooth steering tube, including upper and lower raceway seats machined in said steering tube intermediate the upper and lower ends thereof, raceway seats machined at the upper and lower ends of said head tube for receiving said head set bearings, respectively, said head set bearings being double sealed torque tube bearings.

5. The bicycle defined in claim 4 wherein said front fork is made of aluminum and has a crown and a pair of blades, said crown being constituted by a pair of round miter tubes each having a pair of mitered ends which are welded to the lower end of said steering tube, said pair of blades having mitered ends welded to the respective ends of said round miter tubes and having walls of greater metal thickness at points of maximum stress, dropout members welded to the lower ends, respectively of said blades and a positioning lip on the surface of said dropout.

6. The bicycle defined in claim 4 wherein said head tube has an outside diameter of about 2 inches, said machined smooth steering tube has an outside diameter of about 1-9/16 inches, said bicycle further comprising a stem having a diameter of about 1⅜ inches and a lower end, a tightening wedge including a straight, shallow angled cam surface on an upper end of said tightening wedge complementary with a cam surface on the lower end of said stem and a bolt for drawing said tightening wedge upwardly so that said cam surfaces cause internal gripping of said steering tube by said stem and tightening wedge.

7. The bicycle defined in claim 4 including an aluminum handlebar and a neck, said handlebar being welded to said neck and said neck in turn being welded to the upper end of said stem.

* * * * *